(12) United States Patent
Hsieh et al.

(10) Patent No.: US 8,004,749 B1
(45) Date of Patent: Aug. 23, 2011

(54) PSEUDO COMMON-PATH DPSK DEMODULATOR

(75) Inventors: Yung-Chieh Hsieh, San Jose, CA (US); Chiayu Ai, Newark, CA (US)

(73) Assignee: Optoplex Corporation, Fremont, CA (US)

( * ) Notice: Subject to any disclaimer, the term of this patent is extended or adjusted under 35 U.S.C. 154(b) by 0 days.

(21) Appl. No.: 12/505,483

(22) Filed: Jul. 18, 2009

Related U.S. Application Data (60) Provisional application No. 61/135,356, filed on Jul. 19, 2008, provisional application No. 61/084,229, filed on Jul. 28, 2008.

(51) Int. Cl.
*G02F 2/00* (2006.01)
*G02B 1/10* (2006.01)

(52) U.S. Cl. ........ 359/325; 359/583; 359/584; 356/477; 398/201

(58) Field of Classification Search .................. 359/325, 359/577, 583, 584, 589, 629, 634; 356/450, 356/477; 398/183, 188, 201, 202, 208, 212
See application file for complete search history.

(56) References Cited

U.S. PATENT DOCUMENTS

| | | | | |
|---|---|---|---|---|
| 4,773,732 | A * | 9/1988 | Schafer | 359/578 |
| 6,714,743 | B2 | 3/2004 | Hsieh et al. | |
| 6,909,549 | B1 | 6/2005 | Hsieh et al. | |
| 7,379,187 | B2 | 5/2008 | Feldman | |
| 7,526,210 | B2 * | 4/2009 | Liu | 398/188 |
| 7,668,466 | B2 * | 2/2010 | Tian et al. | 398/202 |
| 7,848,662 | B2 * | 12/2010 | Suzuki et al. | 398/208 |
| 2006/0268277 | A1 | 11/2006 | Hsieh et al. | |
| 2007/0188767 | A1 | 8/2007 | Spanner et al. | |
| 2009/0059351 | A1* | 3/2009 | Xu et al. | 359/325 |
| 2010/0135677 | A1* | 6/2010 | Zaibel et al. | 398/208 |

* cited by examiner

*Primary Examiner* — Daniel Petkovsek
(74) *Attorney, Agent, or Firm* — Antonio R. Durando (57) ABSTRACT

A rhomb beam splitter, rather than a conventional cube, is used in combination with a mirror reflecting both the reflected and transmitted beams to obtain a delay-line interferometer demodulator with a substantially common path. This significantly reduces the sensitivity of the device to environmental changes and also greatly simplifies the manufacture process. A polarization-insensitive coating or a wave plate, a thermal phase tuner with a micro-heater, and two compensator plates are used in the paths of the beams to balance the optical path lengths and to compensate for polarization and environmental effects.

25 Claims, 5 Drawing Sheets

PSEUDO COMMON-PATH DPSK DEMODULATOR

RELATED APPLICATIONS

This application is based on and claims the priority of U.S. Provisional Application Ser. No. 61/135,356, filed Jul. 19, 2008 and U.S. Provisional Application Ser. No. 61/084,229, filed Jul. 28, 2008.

BACKGROUND OF THE INVENTION

1. Field of the Invention

This invention relates to differential phase-shift keying (DPSK) in telecommunication. More specifically, it relates to methods in DPSK for converting a phase-keyed signal to an intensity-keyed signal.

2. Description of the Prior Art

Phase-shift keying (PSK) is a digital modulation scheme that conveys data by changing, or modulating, the phase of a reference signal (the carrier wave). Any digital modulation scheme uses a finite number of distinct signals to represent digital data. In the case of PSK, a finite number of phases is used. Each of these phases is assigned a unique pattern of binary bits. Usually, each phase encodes an equal number of bits. Each pattern of bits forms the symbol that is represented by the particular phase. The demodulator, which is designed specifically for the symbol-set used by the modulator, determines the phase of the received signal and maps it back to the symbol it represents, thus recovering the original data. This requires the receiver to be able to compare the phase of the received signal to a reference signal (such a system is termed coherent).

Alternatively, instead of using bit patterns to set the phase of the wave, the patterns are used to set changes in the phase of the signal. The demodulator then determines the changes in the phase of the received signal rather than the phase itself. Since this scheme depends on the difference between successive phases, it is termed differential phase-shift keying (DPSK). DPSK can be significantly simpler to implement than ordinary PSK because there is no need for the demodulator to have a copy of the reference signal to determine the exact phase of the received signal (i.e., it is a non-coherent scheme).

In telecommunication technology, differential phase-shift keying utilizes a decoding method in order to convert the phase-keyed signal to an intensity-keyed signal at the receiving end. The decoding method can be achieved by comparing the phase of two sequential bits. In principle, it splits the input signal beam into two channels with a small delay before recombining them. After the recombination, the beams from the two channels interfere constructively and destructively. The interference intensity is measured and becomes the intensity-keyed signal. To achieve this, one channel has an optical path longer than the other by a distance equivalent to the photon flight time of one bit. For instance, in a 40 Gbit-per-second system, one bit is equal to 25 ps and light travels 7.5 mm in that period. Thus, in this example, the optical path difference (OPD) between the two channels would be set at 7.5 mm.

The Mach-Zehnder type interferometer with a desired OPD between the two channels has been used for decoding purposes. Because of the properties of optical interference, a change in OPD can greatly affect interference intensity. Moreover, the optical path in each arm is much longer than its difference. Therefore, a sophisticated temperature control is required to maintain the optical path in each arm in order to assure that the change in the OPD is much less than a small fraction of one wavelength, e.g., about 10 nm. This is difficult and expensive to achieve, especially for an interferometer with a long optical path.

Copending U.S. application Ser. No. 11/360,959 and No. 11/485,653 describe various embodiments of novel Michelson-type interferometers used as DPSK demodulators to determine the changes in the phase of a received signal. In the demodulator, the input beam is split into two portions at the beam splitter. The two beams travel a different path and are returned by their corresponding reflector. Because the optical path lengths (OPLs) are different, the two returned beams have a time delay with respect to each other. The OPD of the system, the difference between the two OPLs, is designed to assure that the delay is approximately equal to the time delay of any two successive bits and is equal to the time interval multiplied by the speed of light.

The demodulators based on Michelson-type interferometers provided a significant improvement over the prior art; however, they still require a substantially perfect balance between the two arms of the interferometer in terms path length, polarization phase shift, and thermal compensation. The present invention provides a pseudo common-path delay-line design that materially simplifies the process of achieving and maintaining the required optical path difference in the two arms of the interferometer.

SUMMARY OF THE INVENTION

This invention is based on the idea of using a rhomb beam splitter, rather than a conventional cube, in combination with a mirror reflecting both the reflected and transmitted beams. Using a rhomb beam splitter, so long as the beam splitting surface and the reflective surface of the rhomb structure are parallel and the exit surface is flat, the reflection and transmission beams from the beam splitter will remain parallel to each other toward the reflector regardless of the alignment of the beam splitter with the input beam. Therefore, a single reflector may be used to reflect both beams. These two beams travel together so closely that they are almost in a common path. This significantly reduces the sensitivity of the device to environmental changes and also greatly simplifies the manufacturing process.

In its simplest form, the demodulator of the invention includes a 50/50 rhomb beam splitter wherein the input beam is split into a transmitted beam and a reflected beam that is directed toward and reflected again by the top surface of the rhomb structure, thereby producing two parallel beams. A single, common reflector is then used to reflect both beams back toward the beam splitter, where they are recombined and interfere to produce two separate outputs. As a result of this configuration, the transmitted and reflected beams travel along parallel paths, thereby following what is referred herein as a "pseudo common path."

In another embodiment of the invention, four additional components are used to perfect the performance of the device. A wave plate is used in the path of the reflected beam to compensate for the polarization differential phase introduced by the coating on the beam splitter and on the top reflective surface of the rhomb structure. A thermal phase tuner with a micro-heater is also added in the reflected beam's path to tune the phase of the pseudo common path by varying the temperature of the phase tuner. A first compensator is used in the path of the transmitted beam to cancel the spectral thermal drift introduced by the difference in the lengths of the paths traveled by the reflected and transmitted beams in the glass structure of the rhomb splitter. Finally, a second compensator made of the same material and thickness as the phase tuner is used in the path of the transmitted beam to compensate for the thermal drift of the phase tuner introduced by environmental causes.

In the preferred embodiment of the invention, the reflector is replaced by a second rhomb beam-splitter structure positioned in mirror image configuration with respect to the first rhomb structure. The transmitted and reflected beams are directed toward the reflective top surface and the beam-splitting surface of the second rhomb structure, respectively, thereby producing interfering beams that yield outputs identical to the ones generated by the single-rhomb/reflector combination. The function of two DPSK demodulators may be incorporated into the structure of the invention to achieve the function of a differential quadrature phase-shift keying (DQPSK) demodulator.

Various other advantages will become clear from the description of the invention in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly pointed out in the claims. However, such drawings and descriptions disclose only some of the various ways in which the invention may be practiced.

DETAILED DESCRIPTION OF THE INVENTION

For the purposes of this disclosure, the term "rhomb" is used throughout for simplicity, but it is understood that the precise geometric definition of the beam-splitter structure illustrated in the figures is that of a parallelepiped (that is, a three-dimensional figure formed by six parallelograms, a parallelogram being a quadrilateral with two sets of parallel). However, as mentioned, the only critical feature of the beam-splitter structure of the invention is that it must include a beam-splitting surface and a mirror surface that are parallel. Therefore, the invention is not to be limited to any particular form of beam-splitter structure even though the term rhomb, for a common structure used in the art, has been used throughout for convenience to describe generally all forms that are suitable for practicing the invention.

Figure 1:
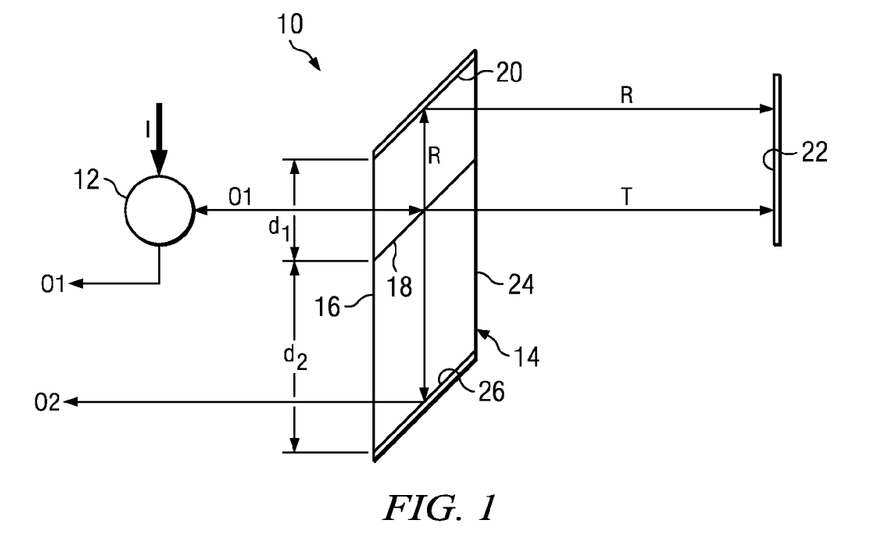
FIG. 1 illustrates schematically the invention in its simplest and most basic form.

Referring to the figures, wherein like reference numerals and symbols are used throughout to refer to the same components, FIG. 1 illustrates schematically a pseudo common-path delay-line interferometric (DLI) demodulator 10 according to the invention. The device includes a circulator 12 that directs an input beam I into a rhomb beam-splitter structure 14 through the front face 16 of the splitter structure. The input beam I is incident onto a 50/50 beam splitting surface 18 and is split into a refection beam R and transmission beam T. The reflection beam R is directed toward the reflective top surface 20 of the beam splitter structure 14, where it is again reflected. So long as the beam-splitting surface 18 and the top mirror surface 20 are parallel, it is clear that, upon reflection from the mirror 20, the reflection beam R will be parallel to the transmission beam T regardless of the angle of incidence of the input beam on the beam splitter. Both beams are then reflected by a reflector 22 positioned at a zero angle of incidence with respect to the two beams. Upon returning to the beam splitter through the flat rear face 24, the beams R and T are recombined to interfere both constructively and destructively, thereby producing the two output beams O1 and O2. O1 retraces the optical path of the input beam I to the circulator 12, while O2 is reflected by the mirror 26 at the bottom portion of the beam-slitter structure 14.

As mentioned, so long as the two reflective surfaces 18,20 of the upper rhomb (that is, the beam-spitting surface and the top mirror surface) are parallel and the surface of the exit rear face 24 is flat, the reflection and transmission beams from the beam splitter structure are parallel to each other, regardless of the alignment of the beam splitter with the input beam. Therefore, the reflector 22 can be positioned advantageously to reflect both beams. The two beams R and T travel together so closely that they are almost in a common path, from which the nomenclature "pseudo common-path" used for the invention is derived. This configuration simplifies greatly the manufacturing process and also reduces significantly the sensitivity of the device to environmental changes.

For the purpose of providing the functionality of a DLI demodulator, still with reference to FIG. 1, the delay between the transmission and reflection arms of the interferometer is set equal to $2nd_1$ where n is the index of refraction of the rhomb beam-splitter medium, $d_1$ is the diagonal thickness of the upper portion of the rhomb structure (as seen in the figure), and $nd_1$ is the one-way path difference. These design parameters are well understood in the art and are not, therefore, described in further detail. The angle and the distance $d_2$ of the surface 26 relative to the beam-splitting surface 18 are arbitrary and irrelevant to the operation of the invention, so long as the output O2 is functionally suitable.

In the configuration of FIG. 1, after the input beam I is split at the beam-splitter surface 18, the reflection beam R following the optical path of the upper arm is reflected one more time (by mirror 20) than the transmission beam T following the lower arm, which causes a polarization-dependent phase error that is retained through the output of the device. Therefore, a corresponding phase correction is preferred and necessary for precision applications. Three different approaches based on a wave-plate, a coating, and an equal-reflection configuration have been tested successfully.

Figure 2:
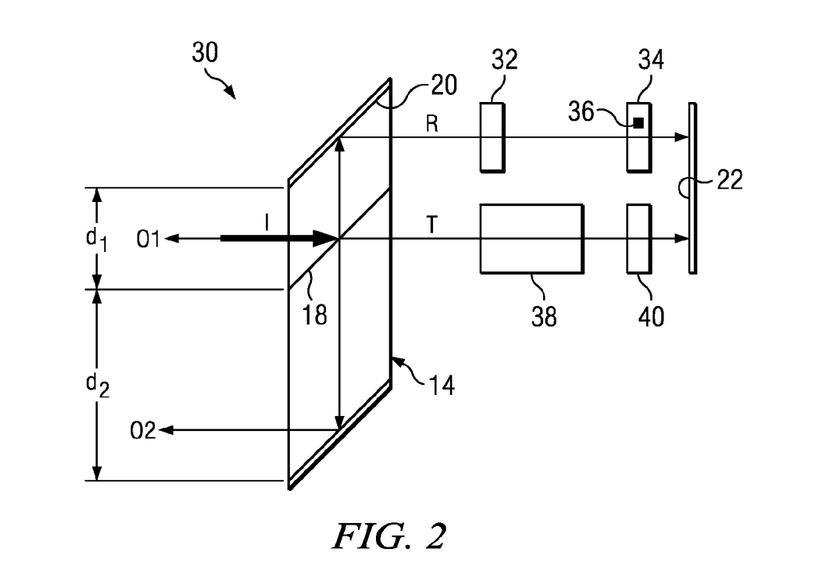
FIG. 2 illustrates schematically the demodulator of FIG. 1 with additional components to compensate for thermal and polarization effects and to provide thermal phase tuning.

FIG. 2 illustrates a corrected demodulator 30 that includes four additional components with respect to the device of FIG. 1. (Note that a circulator 12 in not shown in FIGS. 2-4, but in practice each demodulator would include a circulator for operation.) A wave plate 32 is introduced in the path of either the reflection beam R of the transmission beam T to compensate for the polarization-dependent phase shift introduced by mirror 20 (typically reflective on total internal reflection). A thermal phase tuner 34 with a micro-heater 36 is also placed in the optical path of either the reflection beam or the transmission beam to tune the phase of the DLI. The micro-heater 36 is incorporated into the tuner to vary its temperature as necessary to phase tune the DLI. A first compensator 38, consisting preferably of a glass plate, is introduced into the optical path of the transmission beam T to compensate for thermal effects on the additional glass thickness $d_1$ (and on the wave plate, if one is present) in the upper path traveled by the reflection beam R with respect to the transmission beam T. Finally, a second compensator 40, made of the same material and thickness as the phase tuner, is used to compensate for the thermal drift in the phase tuner introduced by the environment. As one skilled in the art will readily understand, with reference to the wave plate 32 and the compensator 38 of FIG. 2, the delay between the transmission and reflection arms is equal to $2nd_1+2(n_W-1)W-2(n_C-1)C$, where $n_W$ and $n_C$ are the refractive indices and W and C are the thicknesses of the wave plate and the compensator, respectively, and n is the refractive index of the beam-splitter structure's material. Note that the quantities $2(n_W-1)W$ and $2(n_C-1)C$ are the delay contributions of the wave plate and the compensator, respectively, as they are positioned in the configuration of FIG. 2. Those skilled in the art will understand that a wave plate has different refractive indices for two polarizations; therefore, $n_W$ is defined as the average refractive index. Clearly, the two compensators 38 and 40 may be combined to provide the required thermal drift compensation and delay.

Figure 3:
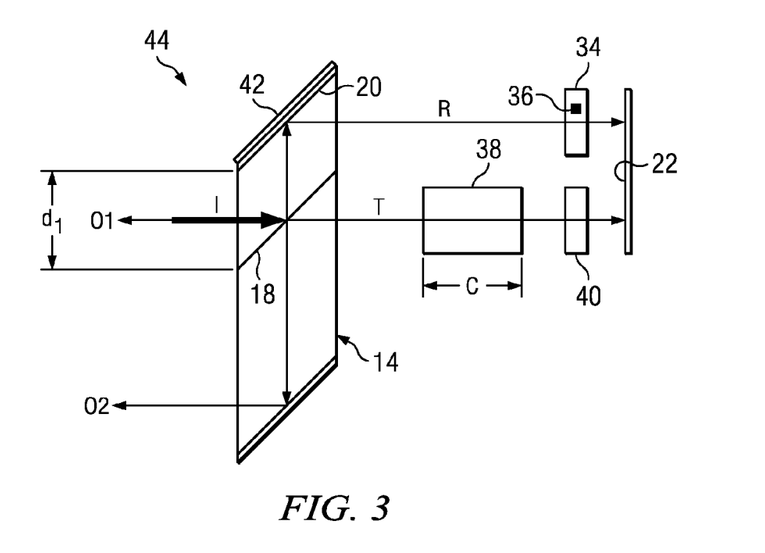
FIG. 3 illustrates schematically the same demodulator of FIG. 2 where the wave plate is replaced by a coating in the upper surface of the rhomb splitter.

FIG. 3 illustrates a design similar to that in FIG. 2, except that the wave plate 32 is removed. The polarization phase compensation is achieved by a polarization-insensitive coating 42 placed on mirror 20. (A polarization-insensitive coating is defined as a coating that does not affect the polarization of an incident beam on reflection. That is, the coating effectively nulls the polarization-dependent phase shift produced by the reflective surface.) The structure and function of the demodulator 44 of FIG. 3 is otherwise identical to the one of FIG. 2. Those skilled in the art will also understand that, in order to compensate for thermal drifts due to the environmental causes, the compensator 38 in the configuration of FIG. 3 will be selected with a thickness C such that the delay between the transmission and reflection arms is equal to $2nd_1-2(n_C-1)C$, where $n_C$ and C are the refractive index and the thicknesses of the compensator, respectively, and n is the refractive index of the beam-splitter structure's material. To compensate for the thermal drift, the optical thermal coefficient $G_C$ of the compensator is selected such that $(G+\alpha) d_1=G_C C$, where G and $\alpha$ are the optical thermal coefficient and thermal expansion coefficient of the beam-splitter structure's material, respectively.

Figure 4:
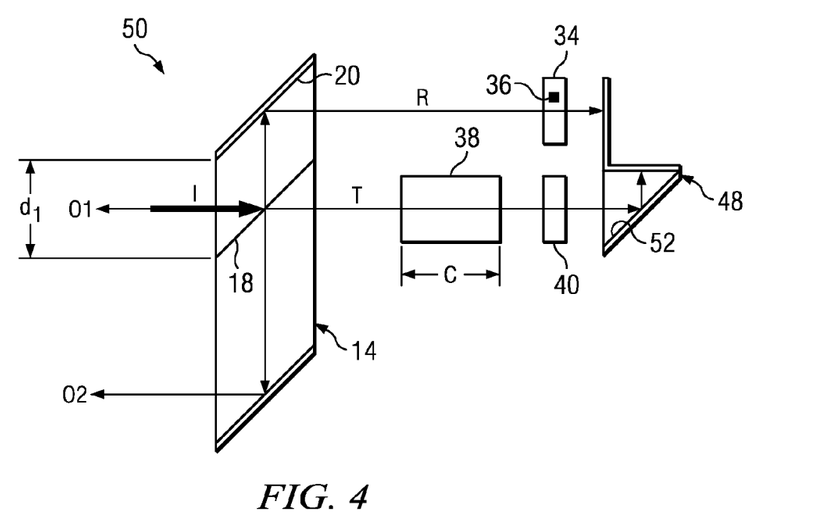
FIG. 4 illustrates a configuration of the device of the invention wherein a right-angle prism is used to effect the same number of reflections in both arms of the interferometer, thereby balancing the phase changes produced by reflection in both arms of the device.

FIG. 4 illustrates yet another approach to compensation wherein a right-angle prism 48 is added to the lower arm of a demodulator 50, so that the optical paths in both DLI arms have the same number of reflection. Thus, if the reflective properties are the same, the phase changes on reflection from the mirror 20 in the upper arm and from mirror 52 in the prism 48 cancel each other out. For example, using the same glass and same coating (or even without coating) to produce total internal reflection in the upper arm and in the prism 48, the polarization-dependent phase shift introduced by mirror 20 will be cancelled by the same polarization-dependent phase shift introduced by the prism 48.

Figure 5:
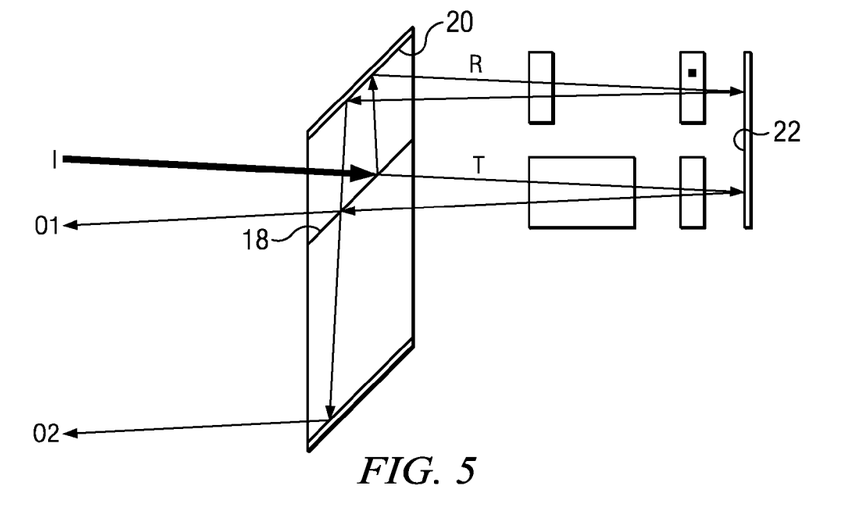
FIG. 5 shows an embodiment wherein the input beam is tilted, thereby eliminating the need for a circulator, as illustrated in FIG. 1.

In the embodiments of FIGS. 1-4, the input beam I and one of the two return beams share the same optical path. Therefore, a circulator 12 is used to extract the return beam, as shown in FIG. 1. However, the circulator can be eliminated, as shown in FIG. 5, by introducing the input beam into the rhomb structure at an angle such that the reflected and transmitted beams impinge on the reflector 22 at an angle of incidence that is not zero (i.e., not normal). In this case, the path of the output beam O1 will no longer be collinear with that of the input beam I, thereby eliminating the need for a circulator. Note that the parallelism of the reflection and transmission beams (R and T) is retained as in the embodiments of FIGS. 1-4 even when the input beam is not normal to the reflector 22, as shown.

Figure 6:
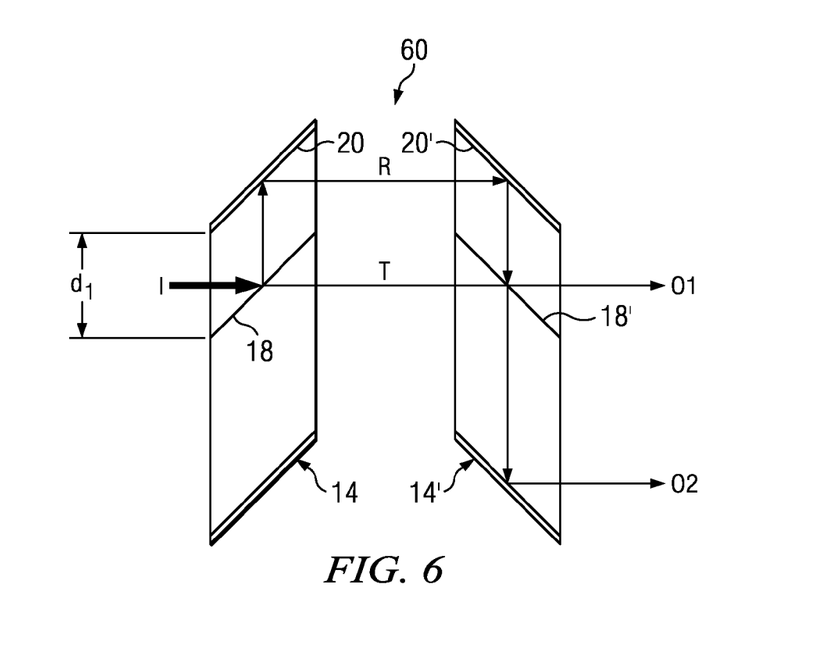
FIG. 6 shows an alternative embodiment of the invention wherein the reflector is replaced by a second rhomb structure aligned with the first one and positioned in mirror image with respect thereto.

FIG. 6 shows a demodulator 60 based on the configuration of FIG. 1 wherein the reflector 22 is replaced by a second beam-splitter structure 14' positioned in mirror image configuration with respect to the first beam-splitter structure 14. As illustrated, the reflected and transmitted beams R and T are directed toward the reflective top surface 20' and the beam-splitting surface 14' of the second structure 14', respectively, thereby producing interfering beams that yield outputs O1 and O2 identical to the ones generated by the configuration of FIG. 1. However, this configuration does not require the use of a circulator 12, nor the non-zero angle of incidence of FIG. 5. Therefore, this design is currently preferred.

Figure 7:
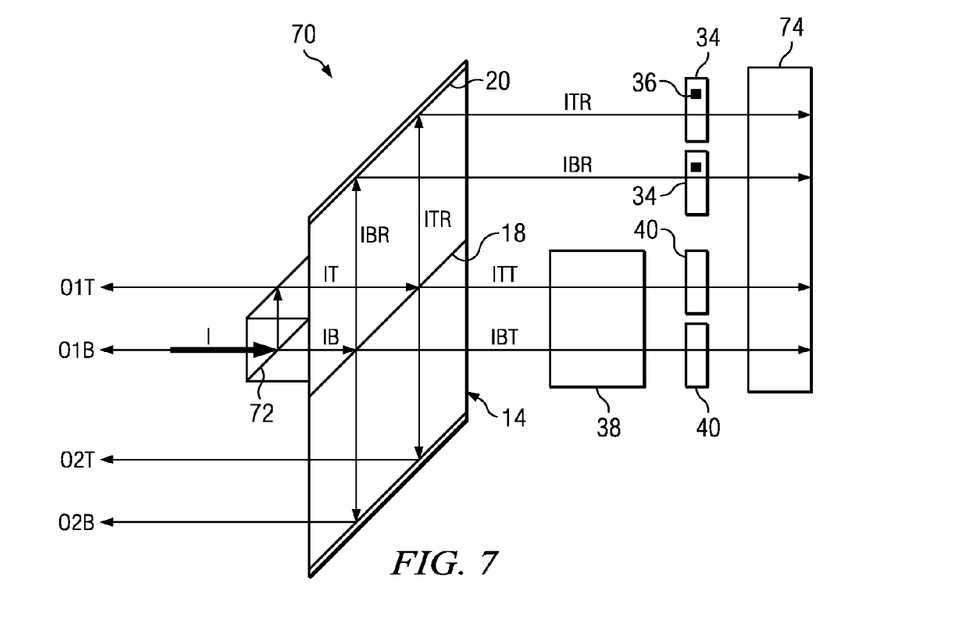
FIG. 7 illustrates in schematic elevational view the use of the structure of the invention to produce two integrated demodulators to achieve the function of a DQPSK demodulator.
Figure 8:
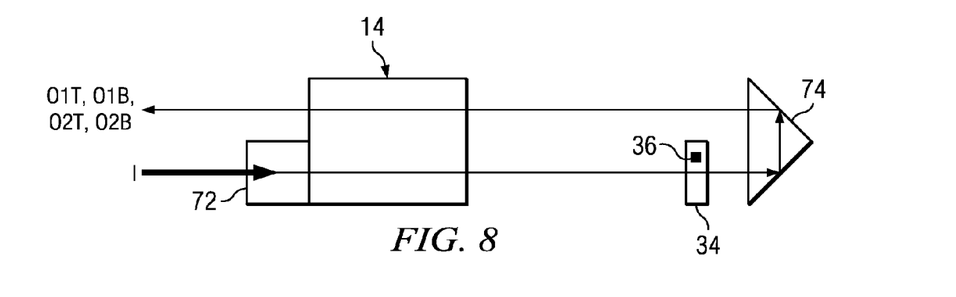
FIG. 8 is a schematic top view of the DQPSK demodulator structure of FIG. 7.

Based on any of the configurations of FIGS. 1-5 detailed herein, the function of two DPSK demodulators may be incorporated into the structure of the invention to achieve the function of a DQPSK demodulator. FIG. 7 illustrates such a demodulator 70 based on the configuration of FIG. 2. The input beam I is first split by a small 50/50 beam splitter 72 and the reflected beam is reflected again so that two equal beams (labeled IT and IB with reference to their respective top and bottom positions) are produced and proceed through the rhomb beam splitter 14 offset by a small displacement. Each beam IT and IB progresses through the device in separate optical paths as described above. However, in order for the output beam O1B to clear the structure of the additional beam splitter 72, the four beams ITR, IBR, ITT and IBT are reflected and folded by a right angle prism 74, as shown in the top view of FIG. 8. The four beams ITR, IBR, ITT and IBT are thus directed back toward the beam-splitter structure 14, where the reflected beams ITR and IBR impinge on the reflective surface 20 and the transmitted beams ITT and IBT impinge on the beam-splitter surface 18. As a result of the constructive and destructive interference taking place at the reflective surface 20, four output beams O1T,O1B,O2T,O2B are produced. Note that the beams returning from the prism 74 could be folded in any direction so long as all beams returning from the common reflector pass through the beam splitter 14 and all output beams clear the upfront splitter 72. Note also that the use of the right-angle reflector 74 eliminates the need for a circulator because no output beam is collinear with the input beam to the system.

Figure 9:
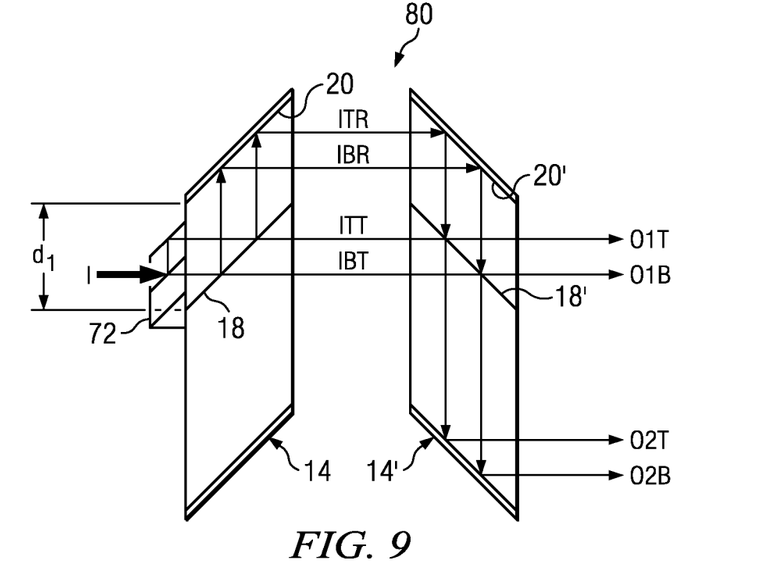
FIG. 9 illustrates in schematic elevational view a DQPSK demodulator based on the configuration of FIG. 6.
Figure 10:
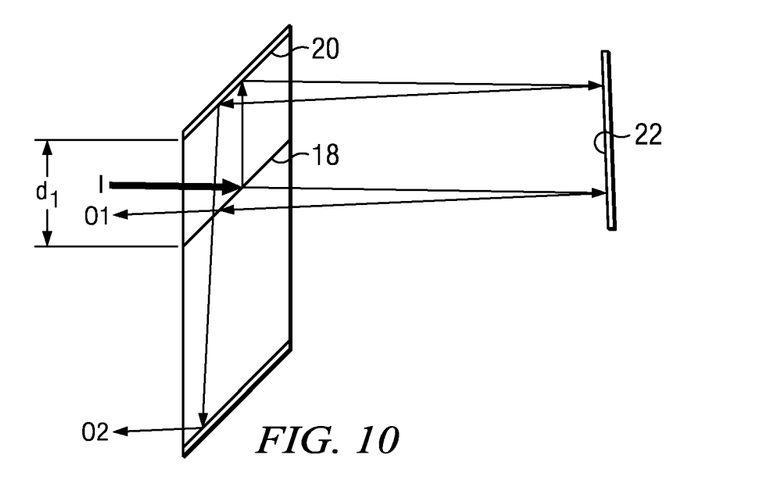
FIG. 10 is a schematic representation of an alternative configuration to the demodulator of FIG. 5

A DQPSK demodulator may be similarly obtained based on the DPSK configuration of FIG. 6. Such a DQPSK demodulator 80, which is preferred, is illustrated in FIG. 9. The input beam I is split by the 50/50 beam splitter 72 so that two equal beams IT,IB impinge on the rhomb beam-splitter structure 14 offset by a small displacement. Each beam IT and IB progresses through the device in separate optical paths, as described above, and the four beams ITR, IBR, ITT and IBT are directed toward the second beam-splitter structure 14', where the reflected beams ITR and IBR impinge on the second reflective surface 20' and the transmitted beams ITT and IBT impinge on the second beam-splitter surface 18'. As a result of the constructive and destructive interference taking place at the second reflective surface 20', four output beams O1T,O1B,O2T,O2B are produced.

Thus, a simple device and mode of operation have been disclosed that provide significant advantages over prior-art demodulators. By making both the reflection beam and the transmission beam from the beam splitter parallel to each other, the same reflector can be used to reflect both beams back to the beam splitter. Polarization-dependent phase shift can be removed by a wave plate, a coating on the mirror, or by equal reflection configuration. Thermal compensation can be achieved with a plate judicially designed with the proper combination of thickness and thermal optical coefficients.

While the invention has been shown and described in what are believed to be the most practical and preferred embodiments, it is recognized that departures can be made therefrom within the scope of the invention. For example, the same effect illustrated in FIG. 5 could be achieved by tilting slightly the reflector 22 (rather than the input beam I) relative to the rhomb structure 14, so that the reflection and transmission beams impinge on it with a non-zero angle of incidence (i.e., not normal to the reflector). As shown in FIG. 9, such a configuration also produces a return beam O1 that is not collinear with the input bean I, thereby avoiding the need for a circulator. Therefore, the invention is not to be limited to the details disclosed herein, but is to be accorded the full scope of the claims so as to embrace any and all equivalent apparatus and methods.

We claim:

1. A delay-line interferometric demodulator comprising:
   a beam-splitter surface in an optical unitary structure having a first reflective surface parallel to the beam-splitter surface, said beam-splitter surface producing a transmission beam and a reflected beam that is further reflected by the first reflective surface to produce a reflection beam; and
   a second reflective surface positioned to receive said transmission beam and reflection beam from the optical structure, and reflect the transmission beam back toward the beam-splitter surface and the reflection beam back toward the first reflective surface so as to further propagate the transmission beam through the beam-splitter surface and the reflection beam through the first reflective surface.

2. The demodulator of claim 1, further including a first compensator in an optical path of said transmission beam to compensate for a thermal drift in an additional optical length traveled by the reflection beam with respect to the transmission beam.

3. The demodulator of claim 1, further including a wave plate to compensate for a polarization-dependent phase shift from said first reflective surface.

4. The demodulator of claim 3, wherein a delay between the transmission and reflection beams is equal to $2nd_1+2(n_W-1)W$, where $d_1$ is a distance between the beam-splitter surface and said first reflective surface, $n_W$ is a refractive index of the wave plate, W is a thickness of the wave plate, and n is a refractive index of said optical structure.

5. The demodulator of claim 1, further including a thermal phase tuner to tune a phase of the delay-line interferometric demodulator.

6. The demodulator of claim 5, further including a second compensator to compensate for a thermal drift in the phase tuner.

7. The demodulator of claim 6, wherein said second compensator is made of the same material and has the same thickness as the phase tuner.

8. The demodulator of claim 1, further including a polarization-insensitive coating on said first reflective surface to compensate for a polarization-dependent phase shift from the first reflective surface.

9. The demodulator of claim 1, wherein said second reflective surface is positioned normal to the transmission beam and the reflection beam received from the optical structure.

10. The demodulator of claim 1, wherein said second reflective surface includes a right-angle prism.

11. The demodulator of claim 1, further including an upfront beam splitter dividing an input beam into two parallel beams directed into the optical structure.

12. The demodulator of claim 1, wherein said second reflective surface is an additional beam-splitter surface in an additional optical structure having an additional first reflective surface parallel to the additional beam-splitter surface; said additional first reflective surface and additional beam-splitter surface being optically aligned with the first reflective surface and the beam-splitter surface of the optical structure, respectively.

13. The demodulator of claim 12, further including an upfront beam splitter dividing an input beam into two parallel beams directed into the optical structure.

14. A method for demodulating optical signals interferometrically, the method comprising the following steps:
   splitting an input beam containing said optical signals into a reflected beam and a transmitted beam in an optical unitary structure having a beam-splitter surface and a first reflective surface parallel to the beam-splitter surface;
   reflecting the reflected beam in said first reflective surface, thereby producing a twice reflected beam; and
   positioning a second reflective surface to reflect the transmitted beam back toward the beam-splitter surface and the twice-reflected beam back toward the first reflective surface so as to further propagate the transmitted beam through the beam-splitter surface and the twice-reflected beam through the first reflective surface.

15. The method of claim 14, further including the step of compensating in an optical path of said transmitted beam for a thermal drift in an additional optical length traveled by the twice reflected beam with respect to the transmission beam.

16. The method of claim 14, further including the step of passing the twice reflected beam through a wave plate to compensate for a polarization-dependent phase shift from said first reflective surface.

17. The method of claim 16, wherein a delay between the transmitted and reflected beams is equal to $2nd_1+2(n_W-1)W$, where $d_1$ is a distance between the beam-splitter surface and the first reflective surface, $n_W$ is a refractive index of the wave plate, W is a thickness of the wave plate, and n is a refractive index of said optical structure.

18. The method of claim 14, further including the step of passing the twice reflected beam through a thermal phase tuner to tune a phase of the twice reflected beam.

19. The method of claim 18, further including the step of compensating for a thermal drift in the phase tuner with a compensator made of the same material and thickness as the thermal phase tuner.

20. The method of claim 14, wherein a polarization-insensitive coating is placed on said first reflective surface to compensate for a polarization-dependent phase shift from the first reflective surface.

21. The method of claim 14, wherein said second reflective surface is positioned normal to the transmitted beam and the twice reflected beam received from the optical structure.

22. The method of claim 14, further including the step of passing the input beam through an upfront beam splitter dividing the input beam into two parallel beams directed into the optical structure.

23. The method of claim 14, wherein said step of reflecting the twice reflected beam and the transmitted beam in a second reflective surface is carried out with a right-angle prism that folds the twice reflected beam and the transmitted beam.

24. The method of claim 14, wherein said second reflective surface is an additional beam-splitter surface in an additional optical structure having an additional first reflective surface parallel to the additional beam-splitter surface; and said additional first reflective surface and additional beam-splitter surface are optically aligned with the first reflective surface and the beam-splitter surface of the optical structure, respectively.

25. The method of claim 24, further including the step of passing the input beam through an upfront beam splitter dividing the input beam into two parallel beams directed into the optical structure.

* * * * *

UNITED STATES PATENT AND TRADEMARK OFFICE
CERTIFICATE OF CORRECTION

| | |
|---|---|
| PATENT NO. | : 8,004,749 B1 |
| APPLICATION NO. | : 12/505483 |
| DATED | : August 23, 2011 |
| INVENTOR(S) | : Yung-Chieh Hsieh and Chiayu Ai |

It is certified that error appears in the above-identified patent and that said Letters Patent is hereby corrected as shown below:

Cover page, item (75), Inventors, cancel "AI" and insert --Ai--.

Signed and Sealed this
Sixth Day of December, 2011

David J. Kappos
*Director of the United States Patent and Trademark Office*